(No Model.)
F. W. STEADLEY.
SPECTACLE CASE FASTENING.
No. 467,386. Patented Jan. 19, 1892.
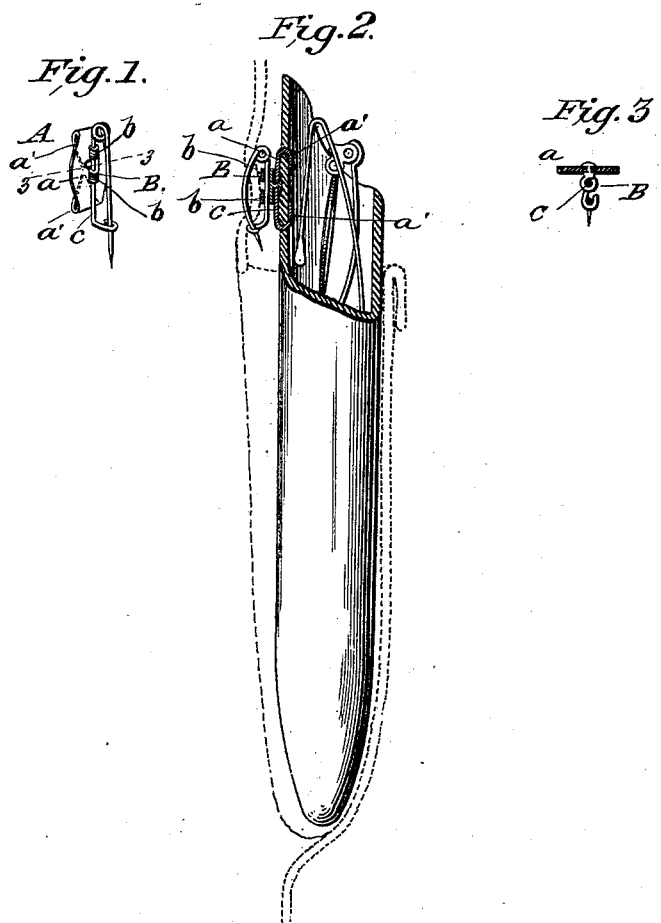
WITNESSES:
Fred G. Dieterich
W. D. Blondel
INVENTOR:
F. W. Steadley
BY Munn & Co.
ATTORNEYS

UNITED STATES PATENT OFFICE.

FREDRIC W. STEADLEY, OF CARTHAGE, MISSOURI.

SPECTACLE-CASE FASTENING.

SPECIFICATION forming part of Letters Patent No. 467,386, dated January 19, 1892.

Application filed February 5, 1891. Serial No. 380,383. (No model.)

*To all whom it may concern:*

Be it known that I, FREDRIC W. STEADLEY, residing at Carthage, in the county of Jasper and State of Missouri, have invented certain new and useful Improvements in Fastenings for Spectacle-Cases, &c., of which the following is a specification.

My invention relates to a device more especially adapted for use in connection with spectacle or eye-glass cases; and it has for its object to provide means for securing such case to the clothing of the user to hold it from displacement or loss and also to admit of the securing-pin having a free movement relative to said case, whereby such fastening will readily adjust itself to the body of the wearer when bending over, stooping, &c.

To this end my invention consists in the novel construction and peculiar combination of parts, as will hereinafter be fully described in the annexed specification, and particularly pointed out in the claim, reference being had to the accompanying drawings, in which—

Figure 1 is a perspective view of my improvement. Fig. 2 is a vertical section thereof, showing the same as applied to a spectacle-case; and Fig. 3 is a horizontal section on the line 3 3, Fig. 1.

The fastening device A consists of a base-plate $a$, the ends of which are formed into prongs $a'$ $a'$, whereby it can be conveniently secured to the spectacle or other case in a manner clearly shown in Fig. 2 of the drawings, by reference to which it will be seen that the said plate is formed with a central aperture in which is swiveled an eye B, which eye is formed with elongated bearings $b$ $b$, arranged parallel with the face of the plate in which is held to turn and to slide longitudinally the rigid member $c$ of a safety pin or hook C, which serves to fasten the device to the clothing of the user, as stated.

In operation the fastener is secured to the spectacle-case in the manner shown, and the said fastener with the case is then secured to the clothing of the wearer usually just above the upper vest-pocket, in which the cases are usually carried. Now, it will readily be seen by joining the safety or stationary pin with the swiveled loop, as stated, that when the wearer bends or stoops over the case is held almost rigid in the pocket. The rigid member $c$ of the pin C, traveling in the bearings $b$ $b$ of the eye B, prevents any possibility of the fastener becoming broken. Furthermore, by providing the elongated bearings $b$ $b$ and arranging such bearings parallel with the base $a$, it serves not only to stiffen the rigid member $c$ and prevent it becoming bent, (which would be the case were there only an ordinary swivel connection,) but also holds the plate A and the spectacle-case in the same parallel plane and provides for an easy movement of the case on the fastener or the fastener on the case, according to the movement of the body, and, furthermore, by making the swivel connection the device is also adapted for any sidewise or lateral movement. Furthermore, by providing for a parallel movement of the pin to the base A avoids the possibility of the case being jerked out of the vest-pocket.

I am aware that it is not broadly new to form a fastening device of a hook or eye in which is held a safety-pin, and do not claim such construction, as my invention tends to remove the objections incident to such fastenings; but What I do claim, and desire to secure by Letters Patent, is—

As an improved article of manufacture, a fastening device for spectacle or other cases, consisting of a base-plate A, provided with means for securing it to the article to which it is to be attached, an eye B, having elongated bearings $b$ $b$ and swiveled to said base-plate, and the safety-pin having its rigid member fitted loosely in said bearings, substantially as described, whereby the pin will be free to turn on the plate A and to turn and slide in the bearings $b$ $b$ of the eye B, and thereby permit the said fastener to yield to motion of the body of the wearer, as set forth.

FREDRIC W. STEADLEY.

Witnesses:
F. A. STEADLEY,
ALEX J. KIRKE.